(12) United States Patent
Schwab

(10) Patent No.: US 11,712,886 B2
(45) Date of Patent: Aug. 1, 2023

(54) DEVICE FOR MEASURING ELEVATIONS ON THE SURFACE OF A ROTARY BODY AND SYSTEM

(71) Applicant: Heidelberger Druckmaschinen AG, Heidelberg (DE)

(72) Inventor: Werner Schwab, Bechtsrieth (DE)

(73) Assignee: Heidleberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 17/507,903

(22) Filed: Oct. 22, 2021

(65) Prior Publication Data

US 2022/0134730 A1    May 5, 2022

(30) Foreign Application Priority Data

Oct. 22, 2020  (DE) .......................... 102020213338.7

(51) Int. Cl.
*B41F 33/00* (2006.01)
*B41F 5/24* (2006.01)
(Continued)

(52) U.S. Cl.
CPC ............ *B41F 33/0072* (2013.01); *B41F 5/24* (2013.01); *B41F 13/10* (2013.01); *G01B 11/2433* (2013.01)

(58) Field of Classification Search
CPC .... B41F 33/0027; B41F 33/0072; B41F 5/24; B41F 13/10; B41F 33/02; B41F 33/14;
(Continued)

(56) References Cited

U.S. PATENT DOCUMENTS

| 4,553,478 A | 11/1985 | Greiner et al. |
| 8,534,194 B2 | 9/2013 | Whitelaw et al. |

(Continued)

FOREIGN PATENT DOCUMENTS

| CN | 102381013 A | 3/2012 |
| DE | 3302798 A1 | 8/1984 |

(Continued)

OTHER PUBLICATIONS

Machine translation of WO 2008/049510 A1, available from espacenet.com (Year: 2008).*

*Primary Examiner* — Matthew G Marini
*Assistant Examiner* — Leo T Hinze
(74) *Attorney, Agent, or Firm* — Laurence A. Greenberg; Werner H. Stemer; Ralph E. Locher

(57) ABSTRACT

A device for measuring elevations on a surface of a rotary body provided as a cylinder, sleeve, or plate for a graphic industry machine, for instance a flexographic printing plate, includes a first motor rotating the rotary body about an axis of rotation and a measuring device including at least one radiation source, at least one line scan camera, and a computer taking contact-free measurements and combining individual images of the line scan camera to form a joint image. The measuring device preferably includes a reference object such as a wire tautened in an axially parallel direction, a second motor and, if required, a further second motor adjusting the measuring device and/or reference object perpendicular to the axis of rotation. The device provides fast high-precision measurements of elevations such as flexographic printing dots. A system includes the measuring device and a flexographic printing press.

12 Claims, 8 Drawing Sheets

(51) Int. Cl.
*B41F 13/10* (2006.01)
*G01B 11/24* (2006.01)

(58) Field of Classification Search
CPC .. B41F 13/12; B41F 33/0009; B41F 33/0036; B41P 2200/12; G01B 11/2433; G01B 11/30

See application file for complete search history.

(56) References Cited

U.S. PATENT DOCUMENTS

| 2010/0018419 A1* | 1/2010 | Whitelaw ............... B41F 13/38 |
| | | 101/248 |
| 2015/0210058 A1* | 7/2015 | Loddenkoetter .......... B41F 5/24 |
| | | 101/481 |

FOREIGN PATENT DOCUMENTS

| DE | 102006060464 A1 | 7/2008 |
| DE | 202007004717 U1 | 9/2008 |
| DE | 102014215648 A1 | 2/2016 |
| EP | 0671264 A1 | 9/1995 |
| EP | 3251850 A1 | 12/2017 |
| WO | 2008049510 A1 | 5/2008 |
| WO | 2010146040 A1 | 12/2010 |
| WO | 2011138466 A1 | 11/2011 |

* cited by examiner

DEVICE FOR MEASURING ELEVATIONS ON THE SURFACE OF A ROTARY BODY AND SYSTEM

CROSS-REFERENCE TO RELATED APPLICATION

This application claims the priority, under 35 U.S.C. § 119, of German Patent Application DE 10 2020 213 338.7, filed Oct. 22, 2020; the prior application is herewith incorporated by reference in its entirety.

FIELD AND BACKGROUND OF THE INVENTION

The present invention relates to a measuring device for measuring elevations on a surface of a rotary body provided as a cylinder, a roller, a sleeve, or a plate for a graphic industry machine, the device including a first motor for rotating the rotary body about an axis of rotation and a measuring device. The present invention also relates to a system including the measuring device of the invention and a flexographic printing press having at least one printing unit including an impression cylinder, at least one flexographic printing cylinder, at least one anilox roller, and at least one drive for adjusting contact pressure between the impression cylinder and the flexographic printing cylinder and/or between the flexographic printing cylinder and the anilox roller.

The technical field of the invention is the field of the graphic industry, in particular the field of taking measurements on rotary bodies such as cylinders, rollers, sleeves, preferably laser-engraved flexographic printing sleeves, or plates, preferably flexographic printing plates mounted to sleeves. In the measuring process, elevations of the rotary body are recorded.

PRIOR ART

German Patent Application DE 33 02 798 A1, corresponding to U.S. Pat. No. 4,553,478, discloses detecting the area coverage/the printing and non-printing areas in connection with a register presetting process to reduce set-up times.

German Patent Application DE 10 2014 215 648 A1 discloses a rotary printing press with a central impression cylinder, which rotates about an axis of rotation, at least one, preferably multiple, printing units disposed around the central impression cylinder and each one including a printing roller with a reference mark, and at least one sensor for detecting the reference mark. The sensor is disposed on a separate rotation device for rotating the sensor about the axis of rotation.

European Patent Application EP 3 251 850 A1 discloses a so-called mounter for determining register data of a sleeve equipped with a printing forme and a register mark in a flexographic printing press, the mounter including a shaft on which the sleeve may be fixed, a recording unit such as a 3D scanner for scanning the surface profile of the printing forme, and a computing unit for allocating the scanned surface profile of the printing forme to a saved target profile and for computing the register data with reference to the register mark as a function of the allocation.

German Patent Application DE 10 2006 060 464 A1, corresponding to U.S. Pat. No. 8,534,194, discloses a rotary printing press with a number of color decks, at least one of which includes a roller, e.g. a flexographic printing cylinder or an anilox roller, and an adjustment system for adjusting the position of the roller relative to at least one other component of the printing press. The at least one color deck includes a control unit equipped to receive and process data which describe the topography of the surface of this specific roller and/or a spatial relationship between a printing pattern and a reference mark formed on the roller. The control unit is furthermore equipped to actuate the adjustment system in accordance with these adjustment data to optimize the position of the roller for a printing operation to print without any or at least with a reduced amount of waste. The determination/scanning of the topography of the cylinder surface may be done using a moving laser head (for laser triangulation or laser interferometry). The aim is to determine the target line pressure for a pre-adjustment (or a register adjustment) and, based thereon, to avoid the creation of waste. Adjustment values for this purpose may be saved on an RFID tag. It is likewise possible to determine printing and non-printing areas. German Utility Model DE 20 2007 004 717 U1, corresponding to U.S. Pat. No. 8,534,194, of the same patent family discloses the use of follower rollers as alternatives for scanning the topography or the use of a laser micrometer as the sensor for taking measurements in accordance with the shading principle. Chinese Patent Application CN 1 02381 01 3 A corresponding to U.S. Pat. No. 8,534,194, of the same patent family discloses a method of adjusting a printing plate cylinder and an embossing roller in a rotary printing press, the method including the steps of mounting the printing plate cylinder for rotation; scanning the circumferential surface of the printing plate cylinder; deriving and saving data which are used to adjust the printing plate cylinder; mounting the embossing roller for rotation; scanning the circumferential surface of the embossing roller; deriving data from the features of the surface of the embossing roller and saving the data which are used to adjust the embossing roller; mounting the printing plate cylinder and the embossing roller to the printing press; adjusting the printing plate cylinder and the embossing roller in accordance with the adjustment data.

The Bobst Company markets a system called "smart-GPS®" for so-called "registration and impression setting." The system uses follower rollers which contact the printing plate to be measured. However, customers demand ways of taking measurements on printing plates in a contact-free way to make sure that damage is avoided even in the case of very fine print dots.

International Publication WO2010/146040A1 discloses something similar; in this document, a camera and an analyzing algorithm in the form of a variance analysis (measured radii compared to theoretical radii) are used.

International Publication WO2008/049510A1 discloses a method and device for checking the quality of at least one printing forme cylinder. An automated implementation of the required quality control measures is made possible by moving the printing forme cylinder to a recording device. The recording device optically scans the surface of the printing forme cylinder in an automated way and automated measuring instruments measure the diameter or circumference of the printing cylinder and/or the surface roughness of its surface. The print image is checked in terms of color density, for instance.

When flexographic printing plates mounted to sleeves or printing sleeves to which ink has been applied by using anilox rollers are used in a printing operation, a number of variances are known: variances relating to the size of the anilox roller, i.e. to the circumference thereof; variances of the thickness of the printing plate along the working width and the roll-off; variances relating to the sleeve over the working width and to concentricity/runout; eccentricity; variances relating to the mounting of the printing plate with adhesive tape; These variances may have a detrimental effect on the operating pressure between the anilox roller and the printing cylinder (including the sleeve, adhesive surfaces, and the printing plate) and between the printing cylinder and the impression cylinder and consequently on the print result.

Thus, various measuring systems are known. However, the market continues to demand improvements, in particular to be able to manufacture printed products of even higher quality at a faster pace and lower costs. The known systems are incapable or at least not fully capable of meeting these demands.

SUMMARY OF THE INVENTION

It is accordingly an object of the invention to provide a device for measuring elevations on the surface of a rotary body and a system, which overcome the hereinafore-mentioned disadvantages of the heretofore-known devices and systems of this general type and which provide an improvement over the prior art which, in particular, provides a way of quickly measuring elevations of rotary bodies such as print dots of a flexographic printing plate, at great accuracy.

With the foregoing and other objects in view there is provided, in accordance with the invention, a device for measuring elevations on the surface of a rotary body in a contact-free way, the rotary body being embodied as a cylinder, roller, sleeve, or plate of a machine for the graphic industry, in particular a printing press, for instance a flexographic printing plate mounted to a sleeve, the device comprising a first motor for rotating the rotary body about an axis of rotation, and a measuring device, in which, for taking contact-free measurements, the measuring device includes at least one radiation source, at least one line scan camera, and a computer for combining individual images of the line scan camera to form a joint image.

A line scan camera differs from an area scan camera in that it includes a substantially one-dimensional light-sensitive line scan sensor rather than a substantially two-dimensional light-sensitive area sensor.

The line scan camera is preferably aligned parallel to the axis (axis of rotation of the rotary body). The line scan camera may include multiple line scan cameras or may be composed of multiple line scan cameras which are preferably of identical construction; for instance, two or more line scan cameras may be combined. The line scan camera may include two line scan cameras, i.e. it may be a line scan camera pair, which generates a stereo image and/or a three-dimensional image of the surface with the elevations thereof (topography).

The line scan camera may be stationary and may record the entire axial extension of the rotary body, in particular of a sleeve with a flexographic printing plate mounted thereto; alternatively, the line scan camera may be shorter than the axial extension of the rotary body and may be moved by a motor in an axial direction for recording purposes; for instance, it may be moved into two or more axial positions.

The device preferably includes a motor for moving the line scan camera continuously or in increments and preferably linearly in a direction perpendicular to the axis or in a plane which is i) substantially tangential or ii) spaced apart and parallel, for instance a jacket surface of the cylinder and/or of the sleeve and/or of the printing forme. The motor preferably includes an encoder. The line scan camera is preferably moved in such a way that the topography of the rotary body—in particular the surface elevations thereof—may be recorded, in particular in its entirety.

The individual images (line images) of line scan camera are preferably computationally combined to form a joint image (area image). The joint image may be computationally analyzed, preferably for instance i) to control the printing pressure, potentially in a closed control loop, or ii) to determine dot density and to use the dot density to control a dryer, in particular in a closed control loop, or iii) to control the machine speed, potentially in a closed control loop, in such a way that vibration caused by rhythmical cylinder bounces are avoided or iv) to control the printing register, potentially in a closed control loop, or v) to detect dust particles or other undesired particles or vi) to position an in-line color measurement device or to implement a number of those measures i) to vi).

In order to take the measurements, the rotary body may be rotated in increments and the line scan camera may take a measurement for every increment, preferably in motion (a moving camera takes measurements while the rotary body is at a standstill). Alternatively, the line scan camera may take measurements by recording incremental line images as the rotary body rotates (the camera is at a standstill while the rotary body rotates). It is alternatively possible to rotate both the rotary body and the camera at the same time and to take measurements this way.

The line scan camera is preferably moved in such a way that a reference object may be recorded. The reference object may either be recorded separately shortly before the elevations are recorded (two measurements) or together with the elevations (one measurement).

The line scan camera may include a light source and the emitted light may be returned, preferably reflected, to the line scan camera by using a reflector. Alternatively, a separate light source may be provided to emit light towards the line scan camera, for instance a laser or an LED as the illumination device or a plurality of such illumination device, in particular illumination device disposed as a row or line).

The use of a line scan camera provides very fast and very accurate measurements.

The device of the invention provides a contact-free way of taking measurements and advantageously avoids any potential damage to the object to be measured, in particular to soft printing dots on flexographic printing plates. A measurement using radiation, in particular electromagnetic radiation such as light, additionally provides very fine measurements, a fact which is advantageous in particular when fine print dots on flexographic printing plates are to be measured.

In operation, such a device provides automated measurements, for instance on a mounted printing plate or on a mounted flexographic printing plate or on a printing sleeve or on a flexographic printing sleeve and consequently provides automated pre-adjustments to set an optimum operating pressure between the cylinders and/or rollers which contribute to the printing operation, for instance between an anilox roller and a printing cylinder with the printing plate, and an impression cylinder. An optimum operating pressure results in a smooth and even print image. The presetting process advantageously reduces or even avoids times of standstill and the amount of waste created during set-up for instance in the case of print job changes.

The use of such a device makes it possible dynamically to adjust the optimum operating pressure, the optimum printing speed, and/or the optimum adapted dryer power as a function of the production speed. Thus an industrial (highly automated, low-cost) production of high-quality prints is possible without the need for a large amount of staff.

If no data network is available and/or great distances between the prepress department (where the flexographic printing plates are manufactured, for instance) and the printing department (where the printing operation on a flexographic printing press takes place) need to be covered, a local use of the device of the invention may ensure that all values required for high-quality prints at the press (among them the operating pressure, the printing speed, and/or the dryer power) are quickly generated with great accuracy and made available.

Further Developments of the Invention:

A preferred further development of the invention may be distinguished in that the line scan camera is aligned to be parallel to the axis of rotation of the rotary body.

A preferred further development of the invention may be distinguished in that the line scan camera includes multiple line scan cameras or is composed of multiple line scan cameras.

A preferred further development of the invention may be distinguished in that the line scan camera includes two line scan cameras, i.e. it is a line scan camera pair and the line scan pair generates a stereo image and/or a three-dimensional image of the surface and the elevations thereof.

A preferred further development of the invention may be distinguished in that the line scan camera is shorter than the axial extension of the rotary body and is moved by a motor in an axial direction for the scanning operation.

A preferred further development of the invention may be distinguished in that the computer analyzes the image and determines the radial distance of individual elevations on the surface from the axis of rotation in the process.

A preferred further development of the invention may be distinguished in that the measuring device for contact-free measurement includes a reference object. The reference object may preferably be a tautened wire (axially parallel with the rotary body). The reference object acts as a reference in the measurement of the elevations of the surface. The reference object or at least the (axially parallel) contour thereof may be recorded along by the line scan camera. If multiple neighboring line scan cameras are used as in the preferred embodiment, the images of the individual cameras may be advantageously aligned with one another with the aid of the reference object or rather the representation thereof (in the camera image). A very precise and thus time-consuming alignment of the camera is thus not necessary. Another advantage may be due to the fact that when a reference object is used and recorded, the amount of data to be processed may be reduced to a considerable extent.

A preferred further development of the invention may be distinguished in that a second motor is provided to adjust the measuring device in a direction perpendicular to the axis of rotation.

A preferred further development of the invention may be distinguished in that the second motor adjusts (preferably not only the measuring device but preferably also) the reference object in a direction perpendicular to the axis of rotation.

A preferred further development of the invention may be distinguished in that a further second motor adjusts the reference object in a direction perpendicular to the axis of rotation. The further second motor is not the aforementioned second motor; i.e. there are two separate second motors.

A preferred further development of the invention may be distinguished in that the radiation source, in particular the light source, irradiates, in particular illuminates, at least one section of the surface.

A preferred further development of the invention may be distinguished in that the reference object is stationary in a direction parallel to the axis of rotation, in particular during the measurement. The reference object may be disposed to be stationary; for instance, a wire may be clamped on both sides so as to be stationary and taut.

A preferred further development of the invention may be distinguished in that the reference object is a line-like object tautened in a direction parallel to the axis of rotation or an object with a cutting edge or a bar. The object with a cutting edge may be a knife-like object. In this case, the cutting edge or an edge of the bar acts as the reference line of the reference object.

A preferred further development of the invention may be distinguished in that the reference object is a tautened string or a tautened wire or a tautened carbon fiber. What is preferred is the use of a tautened wire, which extensive analyses have found to be a practical technical solution of sufficient accuracy. Potential wire vibration during the measurement may computationally be compensated for. In a less preferred case in which a knife or a bar is used, it may be necessary to compensate for thermal changes (expansions) by constructional measures. Computational compensation and consequently the use of a wire is preferred due to lower costs.

A preferred further development of the invention may be distinguished in that a third motor is provided to move the radiation source, in particular the light source, and the camera in a direction parallel to the axis of rotation. The radiation source, in particular the light source, may form a constructional unit with the camera and may in particular be integrated into the camera.

A preferred further development of the invention may be distinguished in that the measuring device includes at least one reflector. The reflector may extend across the axial length of the carrier cylinder. The reflector may be disposed to be stationary. The reflector may be a reflective foil or a foil generating scattered light (white noise).

A preferred further development of the invention may be distinguished in that the camera records at least one joint image or a succession of images or a joint film of an axial region of the contour of the rotary body and of the same axial region of the reference object or of the contour thereof, in particular of the contour thereof facing the contour of the rotary body. Another advantage is that when a reference object, preferably the contour thereof, is used and detected, the amount of data to be processed may be reduced to a considerable extent. A computation of the (radial) heights of the elevations on the printing forme on the basis of digital image processing may make use of the distance discernible in the image between the elevations (or the contours thereof) and the reference object (or the facing contour thereof).

A preferred further development of the invention may be distinguished in that a computer is provided to analyze the image or a succession of images or the film and to determine the radial distance of individual elevations of the surface and the axis of rotation. The succession of images or the film may for instance include one image or up to 10 or up to 1000 images per 1 mm of the circumference of the rotary object. In the axial direction the resolution may be between 10,000 and 100,000 pixels, e.g. 16,000 pixels times 2 cameras, i.e. 32,000 pixels.

The use of so-called AI may be envisaged. AI may for instance assist in analyzing large amounts of data (large surface to be measured and high resolution), for instance when adjustment values for the printing pressure on the drive side and on the operator side are determined, or may even make these analyses autonomously. It may learn from data analyses that have been done before.

Combining the features of the invention, the further developments of the invention, and the exemplary embodiments of the invention, likewise creates advantageous further developments of the invention. In addition, further developments of the invention may include the individual features or combinations of features disclosed in the above section describing the technical field of the invention.

Other features which are considered as characteristic for the invention are set forth in the appended claims.

Although the invention is illustrated and described herein as embodied in a device for measuring elevations on the surface of a rotary body and a system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
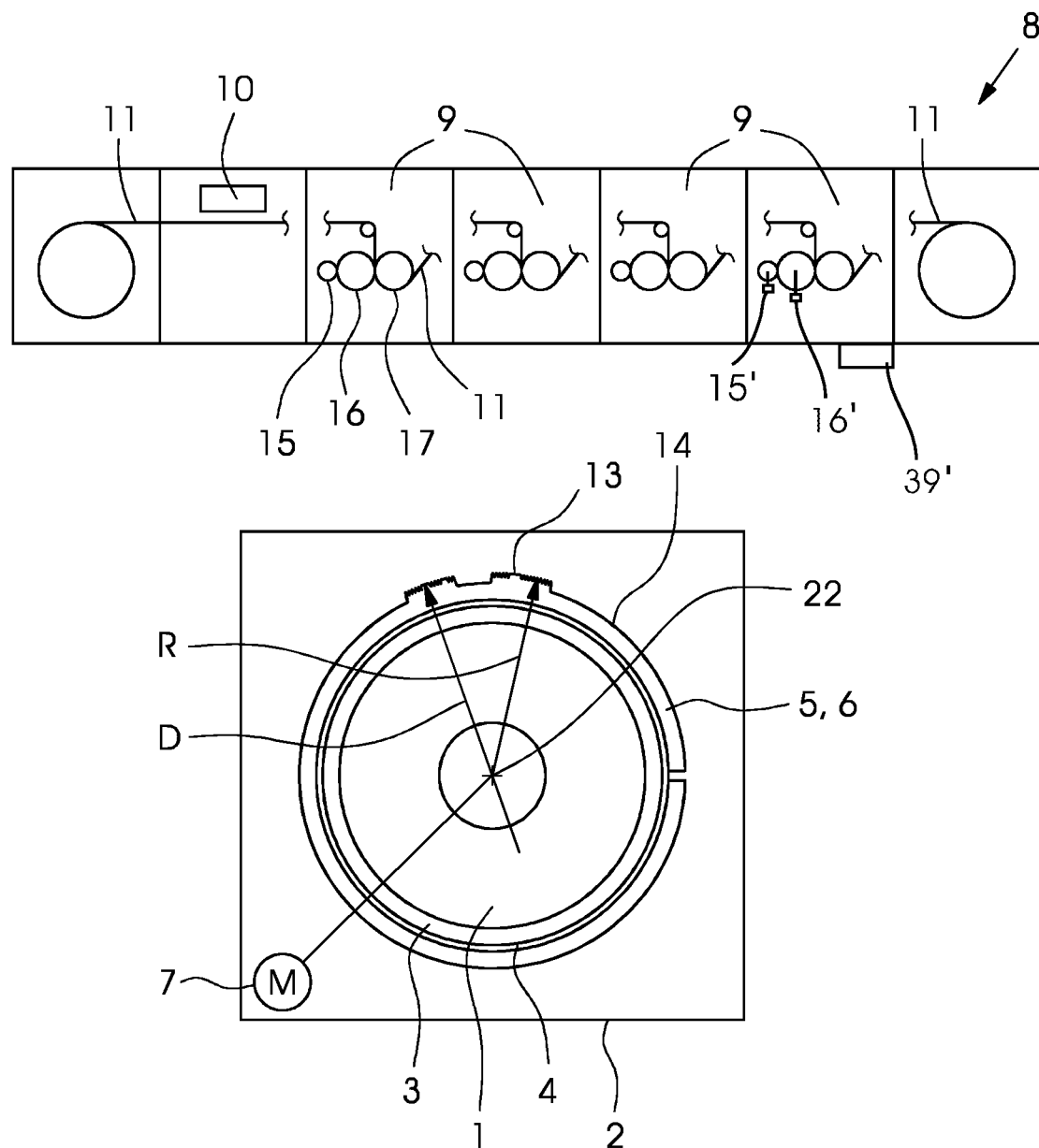
FIGS. 1 to 5 are diagrammatic, elevational views of preferred embodiments of a printing press and a measuring station used in a system according to the invention.

Referring now to the figures of the drawings in detail and first, particularly, to FIG. 1 thereof, there is seen a cross-sectional view of a rotatable carrier cylinder 1 of a measuring station 2, a sleeve 3 received on the carrier cylinder, and a printing plate 5 as a rotary body 6. The printing plate 5 is received on the sleeve 3, preferably fixed to the sleeve by using adhesive tape 4 (or, alternatively, by using an adhesive coating on the sleeve)—a process referred to as "mounting"—and its topography is to be measured. Alternatively, a preferably laser-engraved printing sleeve may be measured on the carrier cylinder.

A motor 7 may be provided in the measuring station to rotate the carrier cylinder during the measuring operation. The measuring station may be a part of a so-called "mounter" (in which printing plates are mounted to carrier sleeves) or it may be separate from a "mounter." The measuring station may be separate from a printing press 8 which includes at least one printing unit 9 for the printing plate 5 and at least one dryer 10 for printing on and drying a printing substrate 11, preferably a web-shaped printing substrate. The printing press is preferably a flexographic printing press. Thus the printing plate is preferably a flexographic printing forme of a diameter of between 106 and 340 mm, for example. The dryer is preferably a hot-air dryer and/or a UV dryer and/or an electron beam dryer and/or an IR dryer. The sleeve may be pushed onto the carrier cylinder from the side. Openings for emitting compressed air to widen the sleeve and to create an air cushion when the sleeve is slid on may be provided in the circumferential surface of the carrier cylinder. The sleeve with the printing plate may be removed from the measuring device after the measuring operation to be slid onto a printing cylinder of the printing unit in the printing press. A hydraulic mounting system may be used as an alternative to the pneumatic mounting system.

The measuring station 2 may be calibrated with the aid of measuring rings 12 provided on the carrier cylinder 1. Alternatively, a measuring sleeve or the carrier cylinder itself may be used for calibration purposes.

Figure 2A:
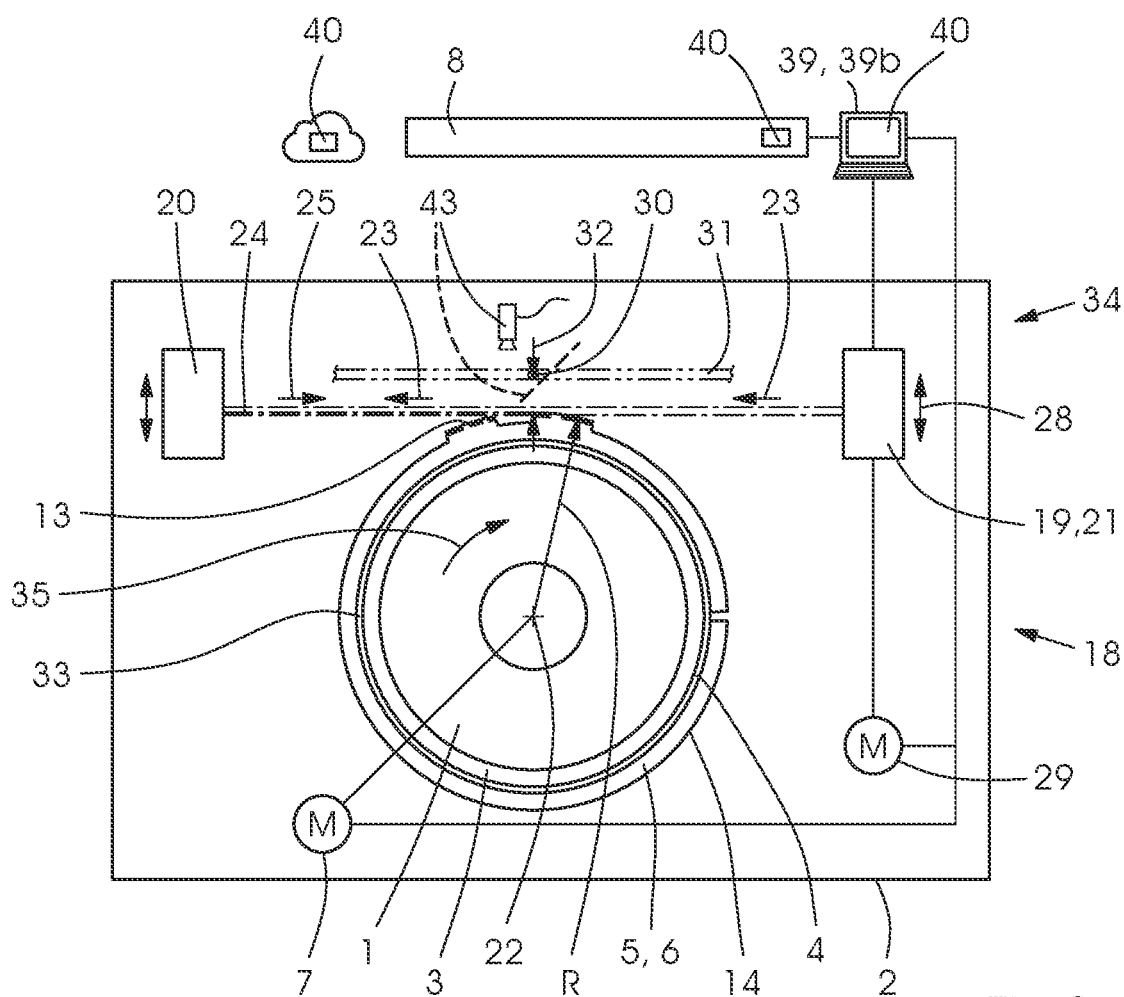
Figure 2C:
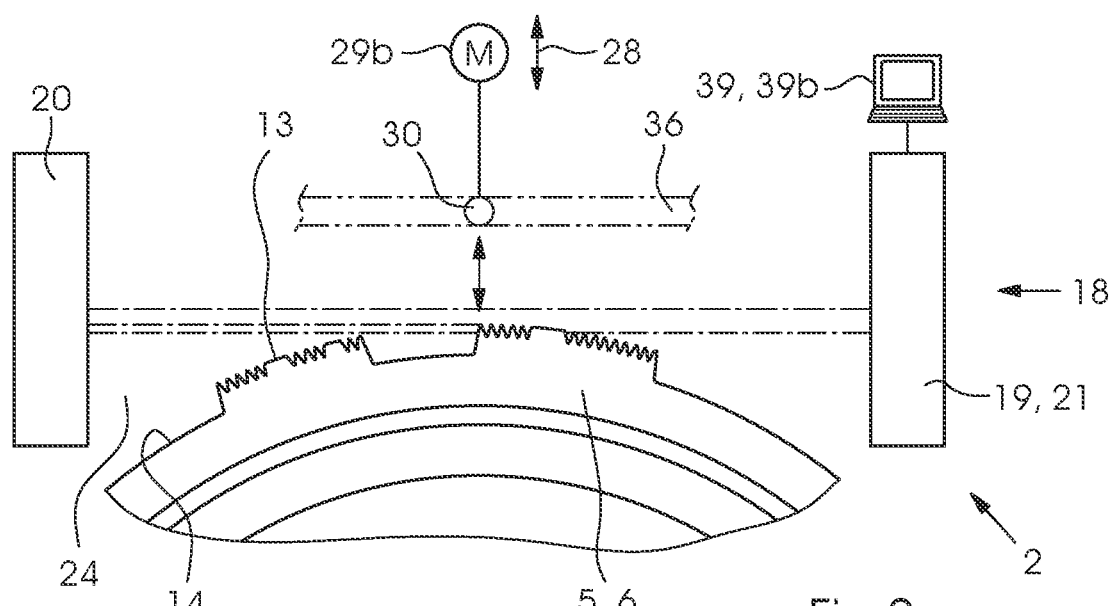

The following figures illustrate preferred embodiments of devices of the invention for taking measurements of elevations 13 in a contact-free way on the surface 14 of a rotary body 6 embodied as a cylinder, roller, sleeve, or plate of the printing press 8 (cf. FIG. 2C). The elevations may be flexographic printing dots (in the halftone) or flexographic printing surfaces (in a solid area) of a flexographic printing plate. The following exemplary embodiments describe the process of taking measurements on a printing plate 5. Taking measurements on the printing plate allows an automated presetting of the respective optimum operating pressure between the cylinders involved in the printing operation, e.g. the anilox cylinder 15, the printing cylinder 16 with the printing plate 5, and the impression cylinder 17.

At least one drive 15', 16' is provided for adjusting contact pressure between the impression cylinder 17 and the flexographic printing cylinder 16 and/or between the flexographic printing cylinder 16 and the anilox roller 15. A further computer 39' of the flexographic printing press 8 receives and uses the data when the contact pressure is adjusted by activating the at least one drive 15', 16'.

Figure 2B:
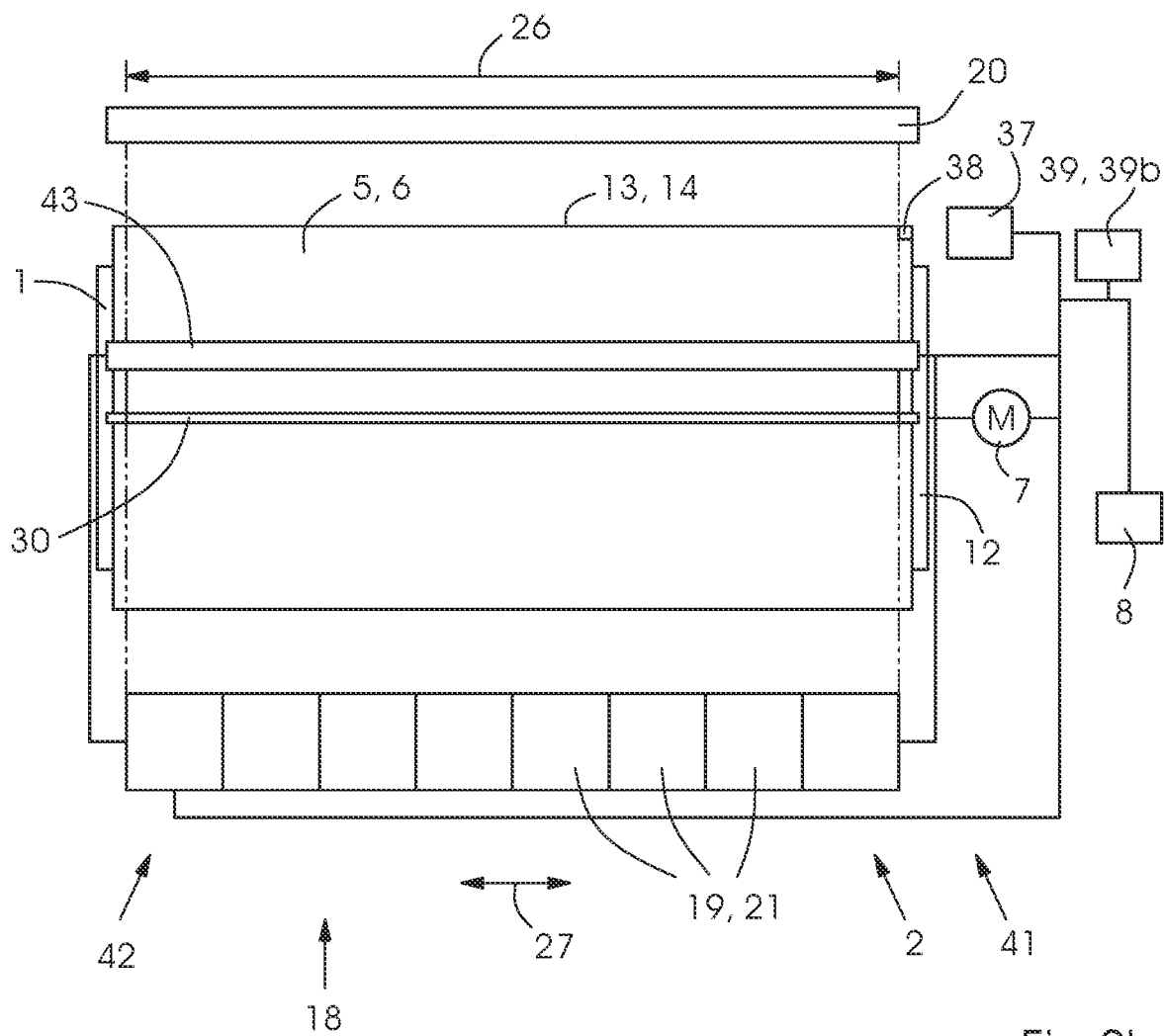

FIGS. 2A to 2C illustrate a preferred embodiment of the device of the invention for measuring the topography of a printing plate 5; FIG. 2A is a cross-sectional view, FIG. 2B is a top view, and FIG. 2C is an enlarged section of FIG. 2A. In accordance with this embodiment, the topography is preferably measured by multiple devices 18 in the course of a 3D radius detection with an optional reference line.

In this and the following embodiments, 2D is understood to indicate that a section of the printing plate 5 (for instance an annular height profile) is scanned and 3D is understood to indicate that the entire printing plate 5 (for instance a cylindrical height profile composed of annular height profiles) is scanned.

The device includes multiple radiation sources 19, in particular light sources 19, preferably LED light sources, at least one reflector 20, and at least one optical receiver 21, preferably a line scan camera and in particular a high-speed camera. The following paragraphs assume that the radiation sources are light sources, i.e. visible light is emitted. Alternatively, the radiation source may emit different electromagnetic radiation such as infrared radiation. The light sources are preferably disposed in a row perpendicular to the axis of rotation 22 of the carrier cylinder 1 and generate a light curtain 23 while the carrier cylinder 1 with the sleeve 3 and the printing plate 5, i.e. the contour, generate a shading 24. The reflected and subsequently received light 25, i.e. substantially the emitted light 23 without the light 24 shaded off by the topography 13, carries information on the topography 13 to be measured. The reflector 20 may be a reflecting foil.

The light source 19 is line-shaped (line scan camera). The light source preferably emits visible light. The light sources 19 and the optical receivers 21 preferably cover the working width 26, i.e. the extension of the printing plate 5 in the direction of its axis 22 (for instance 1650 mm). Preferably, n light sources 19 and receivers 21 may be provided, with 2>n>69, for example. When smaller cameras are used, an upper limit greater than 69 may be necessary. If the entire working width 26 is covered, the printing plate 5 may be measured during one revolution of the carrier cylinder 1. Otherwise the light sources and optical receivers would have to be moved, for instance in a clocked way, in an axial direction 27 along the printing plate.

The preferred cameras for use in the process are cheap but fast cameras 21 such as black-and-white cameras. The cameras may record individual images or a film during the rotation of the printing plate 5.

The device made up of light sources 19, reflector 20, and optical receiver 21 may preferably be moved in a direction 28 perpendicular to the axis 22 of the carrier cylinder 1 to direct the generated strip of light 23 to the topography 13 to be measured or to a reference object 30. For this purpose, a motor 29 may be provided. Alternatively, the reflector may be stationary and only the light source and/or the optical receiver may be moved, for example by using a motor. The light strip 23 is shown twice: in the lower section of the figure it impinges upon the elevations in the measuring process and in the upper region of the figure it impinges upon the reference object.

The motor 29 preferably moves the line scan camera (light source 19 and optical receiver 21) continuously or in steps in a direction 28 in such a way that a plurality of line images is recorded which in total may computationally be processed as an area image. The line images may preferably be computationally combined to form an area image or an area image with multiple planes. A plurality of such planes may result in a topographical image of the mounted printing plate with its elevations. A plurality of such area images may be combined to form a film.

In contrast to the representation, the measuring operation of the topography 13 is preferably occurs in a perpendicular direction (e.g. camera at the bottom and reflector at the top) and not in a horizontal direction because in this case, any potential bending of the carrier cylinder 1 and reference object 30 may be ignored. For this preferred solution, one needs to imagine FIG. 2a rotated through a 90° angle in a clockwise direction.

As an optional reference object 30, a line-like object 30 is provided; the line-like object 30 is preferably a tautened thread 30 or a tautened string 30, for instance a metal wire or a carbon fiber or a blade (or a blade-like object or an object with a cutting edge) or a bar, which creates a reference line 31 for the plurality of optical receivers 21. The line-like object preferably extends in a direction parallel to the axis of the carrier cylinder 1 and is preferably disposed a short distance 32, for instance 2 mm to 10 mm (20 mm at the maximum) away from the circumferential surface 33/the printing plate 5 disposed thereon. The received light 25 further includes information that may be analyzed on the reference object 30 such as its location and/or distance from the surface 14 of the printing plate 5 (the surface being preferably etched and therefore on a lower level than the elevations 13). The reference line may be used to determine the radial distance R of the topography 13/contour or the contour's elevations from the reference object 30, preferably by using digital image processing. The distance between the reference object 30 and the axis 22 of the carrier cylinder 1 is known due to the configuration and/or a motorized adjustment of the reference object 30 (optionally together with the light source 19 and the optical receiver 21 and the reflector 20 if provided). Thus the radial distance of the contour elevations, i.e. the radius R of the print dots, may be determined by computation. Due to the use of the reference object 30 and the presence of shades created by it/of a reference line 31 corresponding to the shade (in the recorded image/from the received light) of every camera 21 a precise, of the cameras relative to one another is not strictly necessary. Moreover, the reference object 30 may be used to calibrate the measuring system.

For the purpose of movement/adjustment in a direction 28 the reference object 30 may be coupled to the light source 19 and/or to the motor 29. Alternatively, the reference object may have its own further second motor 29b for movement/adjustment purposes.

For an initial referencing of the device, a measurement preferably is taken on an ("empty") carrier cylinder or on a measuring sleeve disposed thereon (measuring the distance between the reference object and the surface from DS to OS).

For a further initialization of the device before the measuring operation, a first step preferably is to move the line scan camera 21 towards the carrier cylinder 1. The movement is preferably stopped as soon as the camera detects preferably the first elevation. Then the reference object 30 is preferably likewise moved in direction 28 until a predefined distance, e.g. 2 mm from the carrier cylinder 1 is reached.

The light source 19 and optical receiver 21 may alternatively be disposed on opposite sides of the carrier cylinder 1; in such a case no reflector 20 is required.

The light source 19, the reflector 20 (if it is present in the embodiment), the optical receiver 21 and the optional reference object 30 form a unit 34, which is movable (in a direction perpendicular to the axis 22 of the carrier cylinder), in particular adjustable or slidable by a motor.

During the measuring operation, the carrier cylinder 1 and the printing plate 5 located thereon preferably rotate to ensure that preferably all elevations 13 in the circumferential direction 35 may be scanned. Based thereon, a topographic image and the radius R of individual elevations 13, e.g. flexographic printing dots, from the axis 22 or the diameter D (measured between opposite elevations) may be determined as a function of the angular position of the carrier cylinder 1.

In the enlarged view of FIG. 2C, a section of the topography 13 of the printing plate 5 as well as the shading 24 of the topography and the shading 36 of the reference object 30 are visible. The topographic elevations 13 may be in a range between 2 μm and 20 mm.

A sensor 37 for identifying the sleeve 3 and/or the printing plate 5 based on an identification feature 38 may be provided (cf. FIG. 2B). This feature may, for instance, be a bar code, a 2D code such as a QR code or a data matrix code, a RFID tag, or a NFC tag.

The signals and/or data generated by the optical receivers 21 and including information on the topography 13 of the measured surface 14 and on the reference object 30 are transmitted to a computer 39 to be processed, preferably through a wire or a wireless connection. The computer is connected to the printing press 8. The computer 39 analyzes the information.

Before the measurement, the reference object 30 may be moved into the reception range of the optical receiver 21 to calibrate the optical receiver. The optical receiver 21 detects the reference object and transmits the signals generated in the calibration to the computer 39. The calibration data are saved in the digital memory 40 of the computer 39.

This provides a way of saving a virtual reference object on the computer 39. Subsequently the reference object 30 is removed from the range of the optical receiver 21 and the topography 39 of the surface 14 to be measured is processed together with the virtual reference object.

The result of the analysis is saved in a digital memory 40 of the computer, in a digital memory 40 of the printing press, or in a cloud-based memory. The saved results are preferably saved in association with the respective identification mark 38. When the sleeve-mounted printing plate 5 (or sleeve/flexographic printing forme) is used in the printing press 8 at a later point, the identification feature 38 of the printing plate 5/flexographic printing forme (or sleeve) may be scanned again to access the values associated with the identification mark 38, for instance for presetting purposes. For instance, the printing press may receive the data required for a print job from the cloud-based memory.

The result of the analysis may preferably include up to four values: The printing pressure adjustments on the two sides 41/DS (drive side) and 42/OS (operator side) between the printing cylinder 16, i.e. the cylinder carrying the measured printing plate 5, and the impression cylinder 17 or printing substrate transport cylinder 17, and the printing pressure adjustments between an anilox roller 15 for inking the measured printing plate 5 and the printing cylinder 16 as they are required during operation.

In addition, a device 43 for determining dot density, for instance by optical scanning, may be provided, preferably a laser triangulation device, a CIS (contact image sensor) scan bar, or a line scan camera. Alternatively, the device 43 may be a mirror which may pivot or be movable in a way for it to be usable together with the light sources 19, 21 to measure dot density. The device is preferably connected to a device for image processing and/or image analysis, which is preferably identical with the computer 39—i.e. the computer 39 programmed in a corresponding way—or which may be a further computer 39*b*.

A CIS scan bar may be disposed to be axially parallel with the cylinder. It preferably includes LED for illumination and sensors for recording images (similar to a scan bar in a commercial copying machine). The bar is preferably disposed at a distance of 1 to 2 cm from the surface or is positioned at this distance. The cylinder with the surface to be measured, e.g. the printing plate, rotates underneath the bar, which generates an image of the surface in the process to make it available for image analysis to determine dot density. The data obtained from the dot density determination process may additionally be used, for instance, computationally to select or recommend the best anilox roller from among a plurality of available anilox rollers for the printing operation with the recorded printing forme.

Figure 3A:
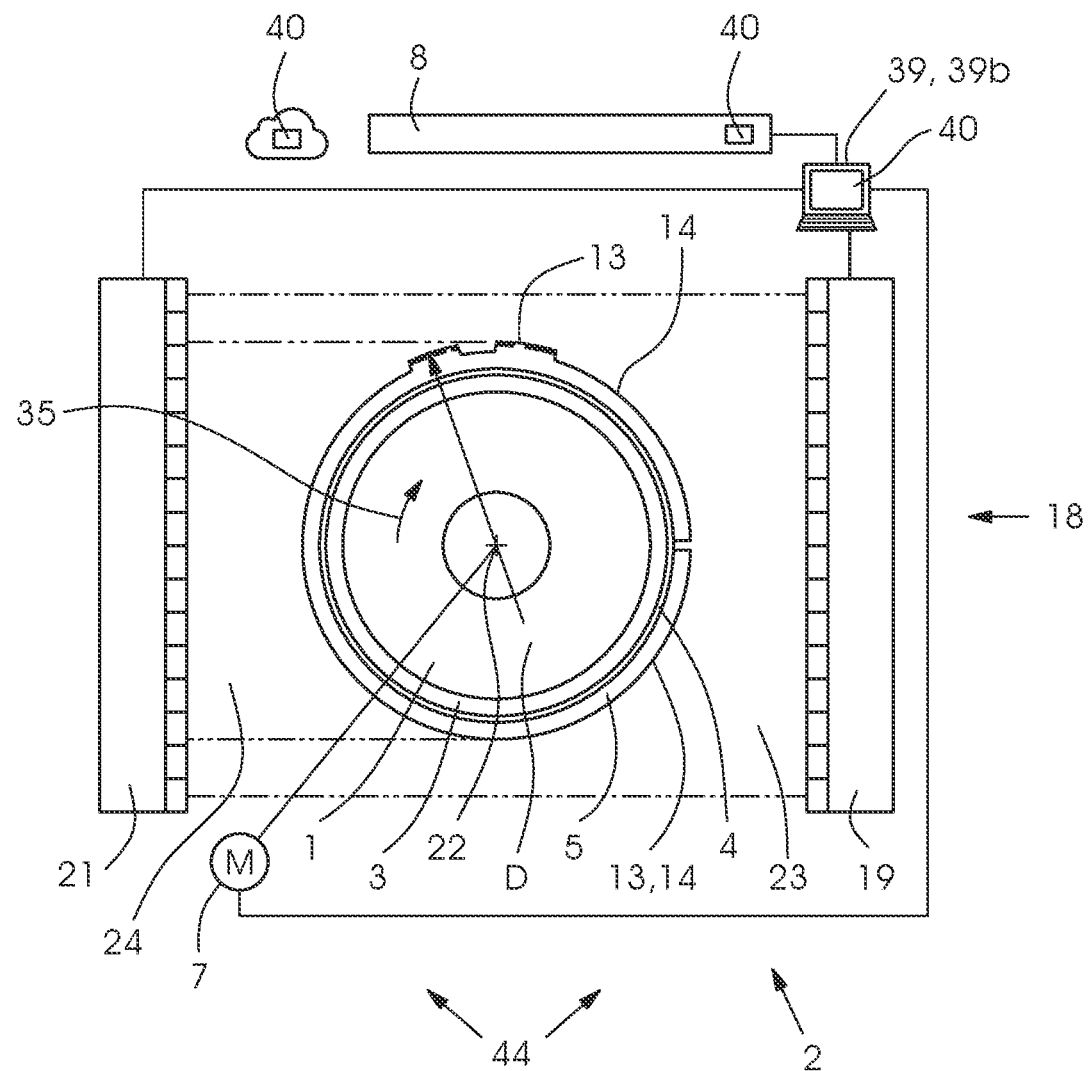
Figure 3B:
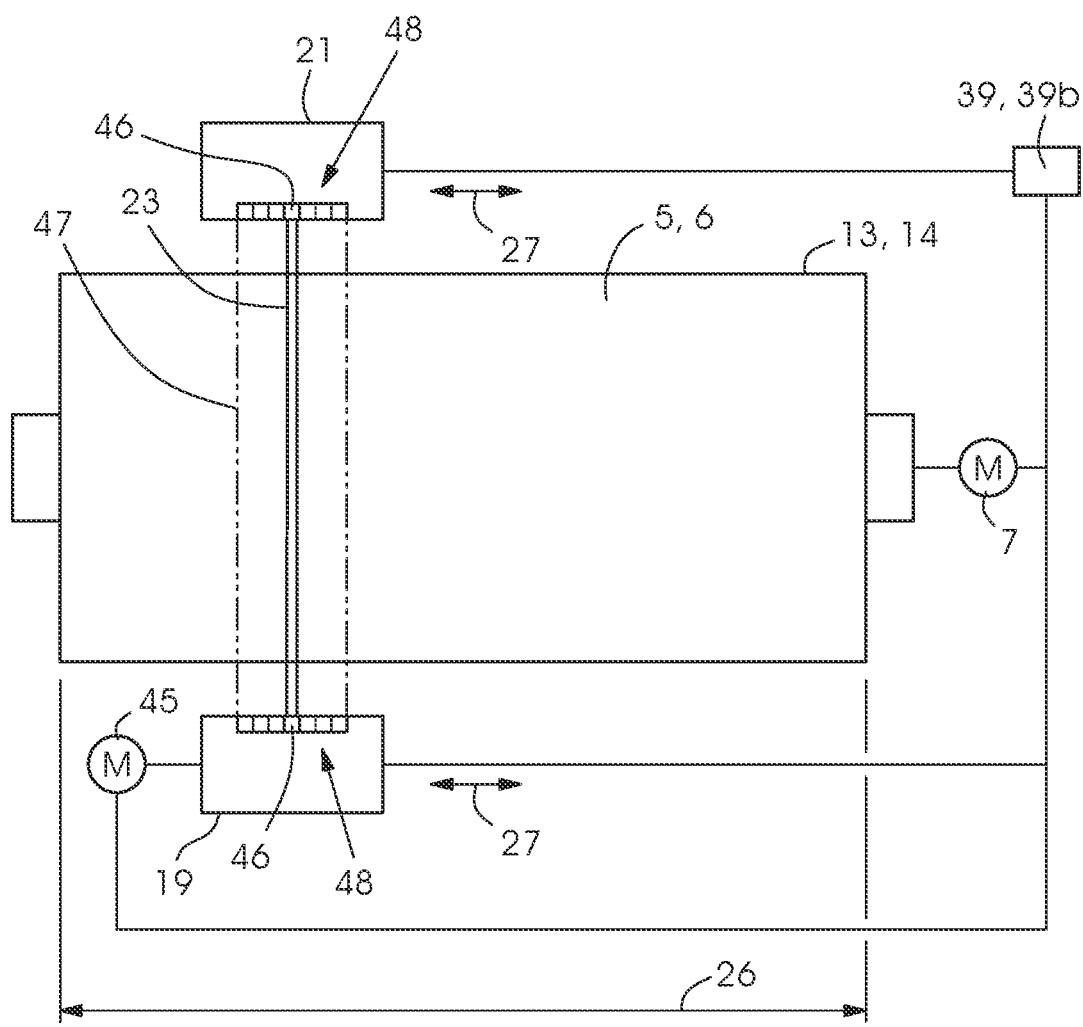

FIGS. 3A and 3B illustrate preferred embodiments of the device of the invention for measuring the topography of a printing plate 5; FIG. 3A is a cross-sectional view and FIG. 3B is a top view. In accordance with this embodiment, the topography is preferably scanned by a laser micrometer 44 in the course of a 2D diameter determination process.

The device includes a light source 19, preferably a line-shaped LED light source 19 or a line-shaped laser 19, and an optical receiver 21, preferably a line scan camera 21. Together, the laser and optical receiver form a laser micrometer 44. The light source 19 generates a light curtain 23 and the carrier cylinder 1 with the sleeve 3 and the printing plate 5 creates a shading 24. The line lengths of the light source 19 and the optical receiver 21 are preferably greater than the diameter D of the carrier cylinder including the sleeve and printing plate to allow the topography to be measured without any movement of the device 44 perpendicular to the axis 22 of the carrier cylinder. In other words, the cross section of the carrier cylinder is completely within the light curtain.

The device 44 including the light source 19 and the optical receiver 21 may be moved in a direction parallel to the axis 22 of the carrier cylinder (in direction 27) to record the entire working width 26. For this purpose, a motor 45 may be provided.

A sensor 37 for identifying the sleeve 3 and/or the printing plate 5 based on an identification feature 38 may be provided (cf. FIG. 2B).

The signals and/or data generated by the optical receivers 21 are transmitted, preferably through a wire or a wireless connection, to a computer 39, where they are processed. The computer is connected to the printing press 8.

Light source 19 and optical receiver 21 may alternatively be disposed on the same side of the carrier cylinder 1; if this is the case, a reflector 20 is disposed on the opposite side in a way similar to the one shown FIGS. 2A and 2C.

In accordance with an alternative embodiment, the topography is preferably recorded using a laser micrometer 44 in the course of a 2D diameter determination process, which does not only record an individual measuring row 46, but a wider measuring strip 47 (illustrated in dashed lines) formed of multiple measuring rows 48 (illustrated in dashed lines). In this exemplary embodiment, the light source 19 and the optical receiver 21 are preferably two-dimensional and not just line-shaped. The light source 19 may include multiple light rows 48 of a width of approximately 0.1 mm and at a distance of approximately 5 mm from one another. In this example, the camera is preferably a line scan camera.

Figure 4A:
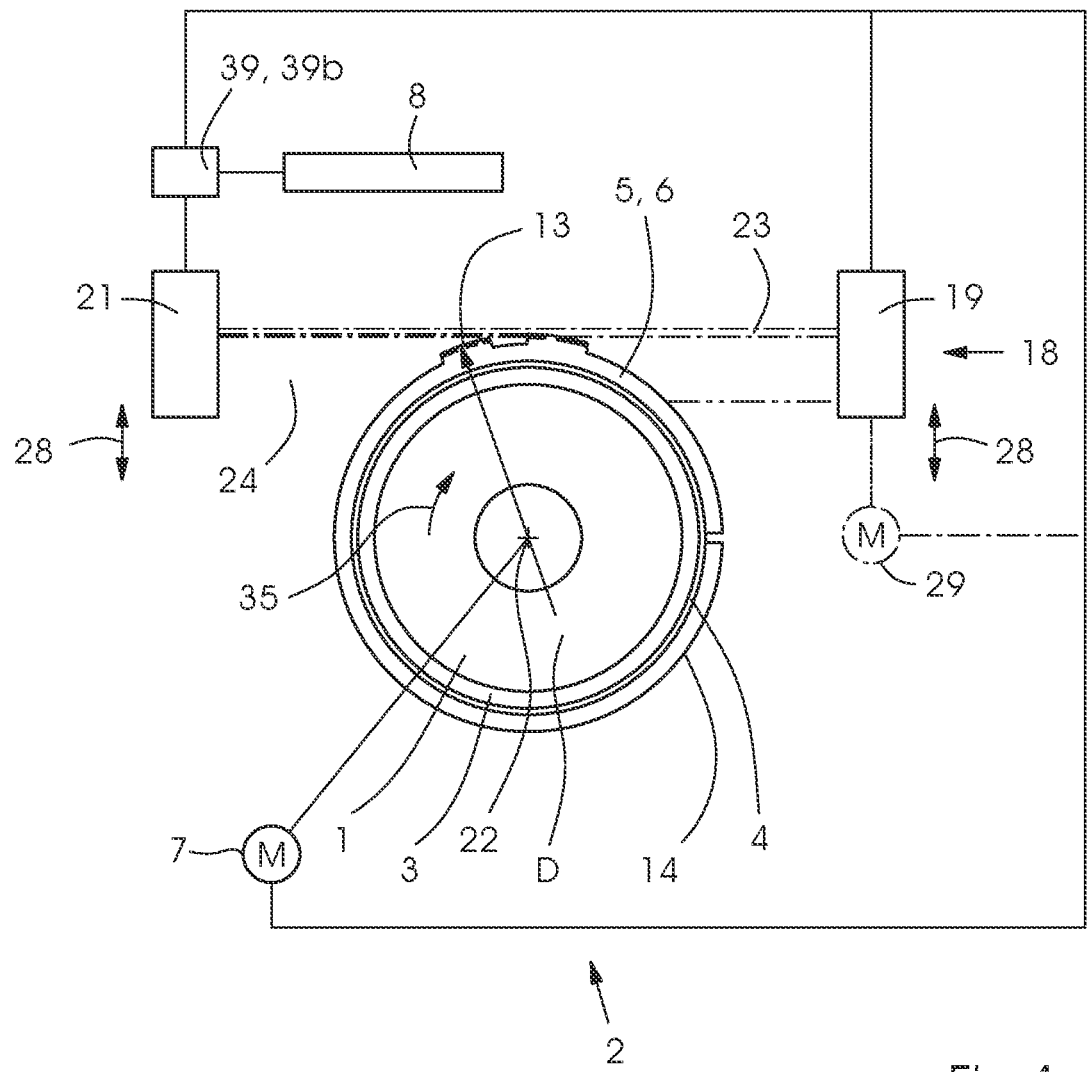
Figure 4B:
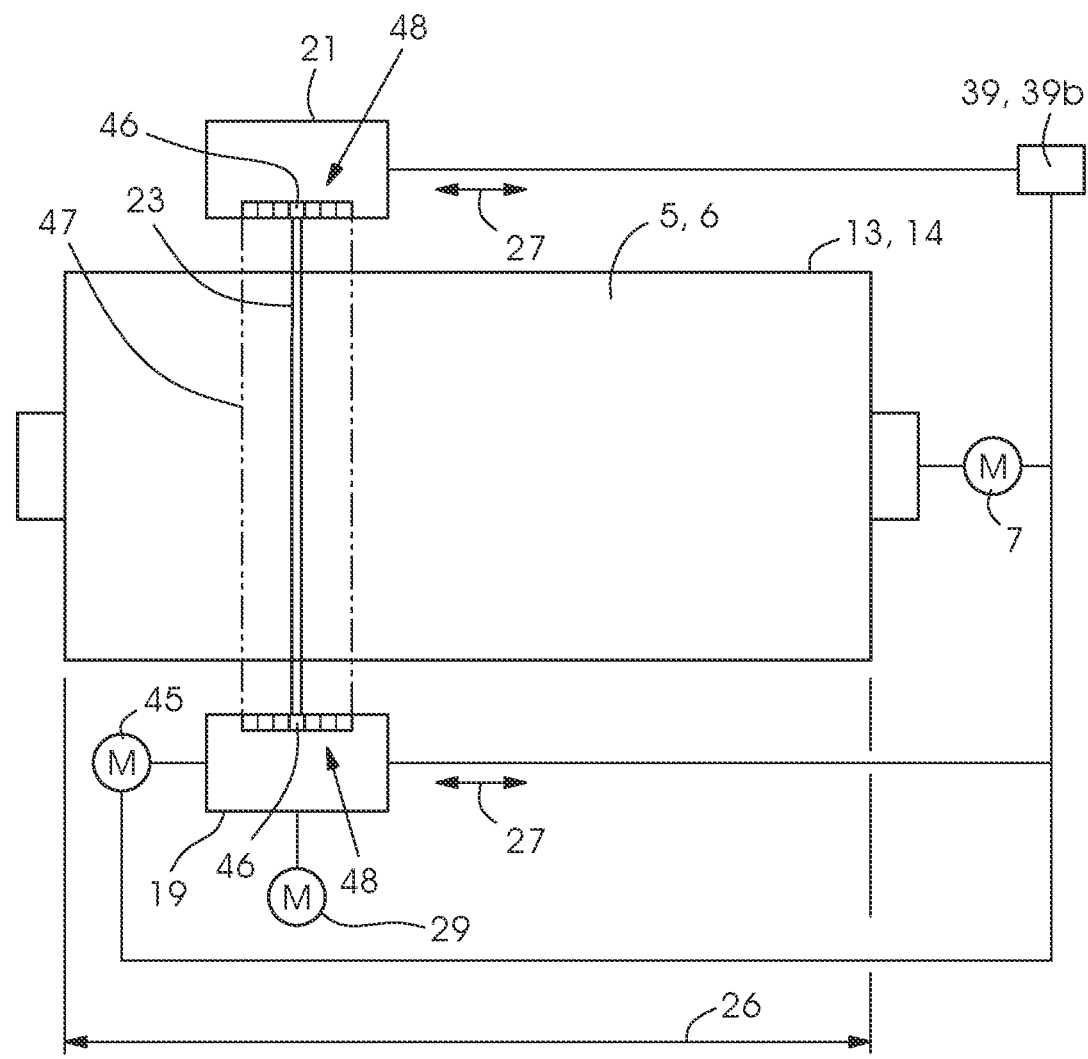

FIGS. 4A and 4B illustrate preferred embodiments of the device of the invention for measuring the topography of a printing plate 5; FIG. 4 is a cross-sectional view and FIG. 4 is a top view. In accordance with this embodiment, the topography is preferably scanned by a laser micrometer in the course of a 2D diameter determination process.

The device includes a light source 19, preferably an LED light source 19, and an optical receiver 21, preferably a line-shaped LED light source 21 or a line-shaped laser 21. The light source 19 generates a light curtain 23 and the carrier cylinder 1 with the sleeve 3 and the printing plate 5 creates a shading 24.

The device made up of the light source 19 and optical receiver 21 may preferably be moved in a direction 28 perpendicular to the axis 22 of the carrier cylinder 1 to direct the light curtain 23 to the topography 13 to be measured. For this purpose, a motor 29 may be provided. In a case in which the light curtain 23 is wide enough to cover the entire measuring area, the motor 29 is not necessary.

The signals and/or data generated by the optical receivers 21 are transmitted for further processing, preferably by wire or wireless connection, to a computer 39. The computer is connected to the printing press 8.

The light source 19 and the optical receiver 21 may alternatively be disposed on the same side of the carrier cylinder; if this is the case, a reflector 20 is disposed on the opposite side in a way similar to the one shown FIGS. 2A and 2C.

In accordance with an alternative embodiment, the topography 13 is preferably scanned using a laser micrometer 44 in the course of a 3D diameter determination process, which does not only record one measuring row 46, but a wider measuring strip 47 (illustrated in dashed lines), i.e. multiple measuring rows 48 at the same time. In this embodiment, the light source 19 and the optical receiver 21 are two-dimensional and not just line-shaped.

In accordance with a further alternative embodiment, the topography 13 is preferably scanned using a laser micrometer 44 in the course of a 3D diameter determination process, in which the device including the light source 19 and the optical receiver 21 may preferably be moved in a direction 28 perpendicular to the axis of the carrier cylinder 1 to direct the light curtain 23 to the topography 13 to be measured. For this purpose, a motor 29 (illustrated in dashed lines) may be provided.

In accordance with an alternative embodiment, the topography 13 is preferably scanned using a laser micrometer 44 in the course of a 3D radius determination process, in which the two latter alternative embodiments are combined.

Figure 5:
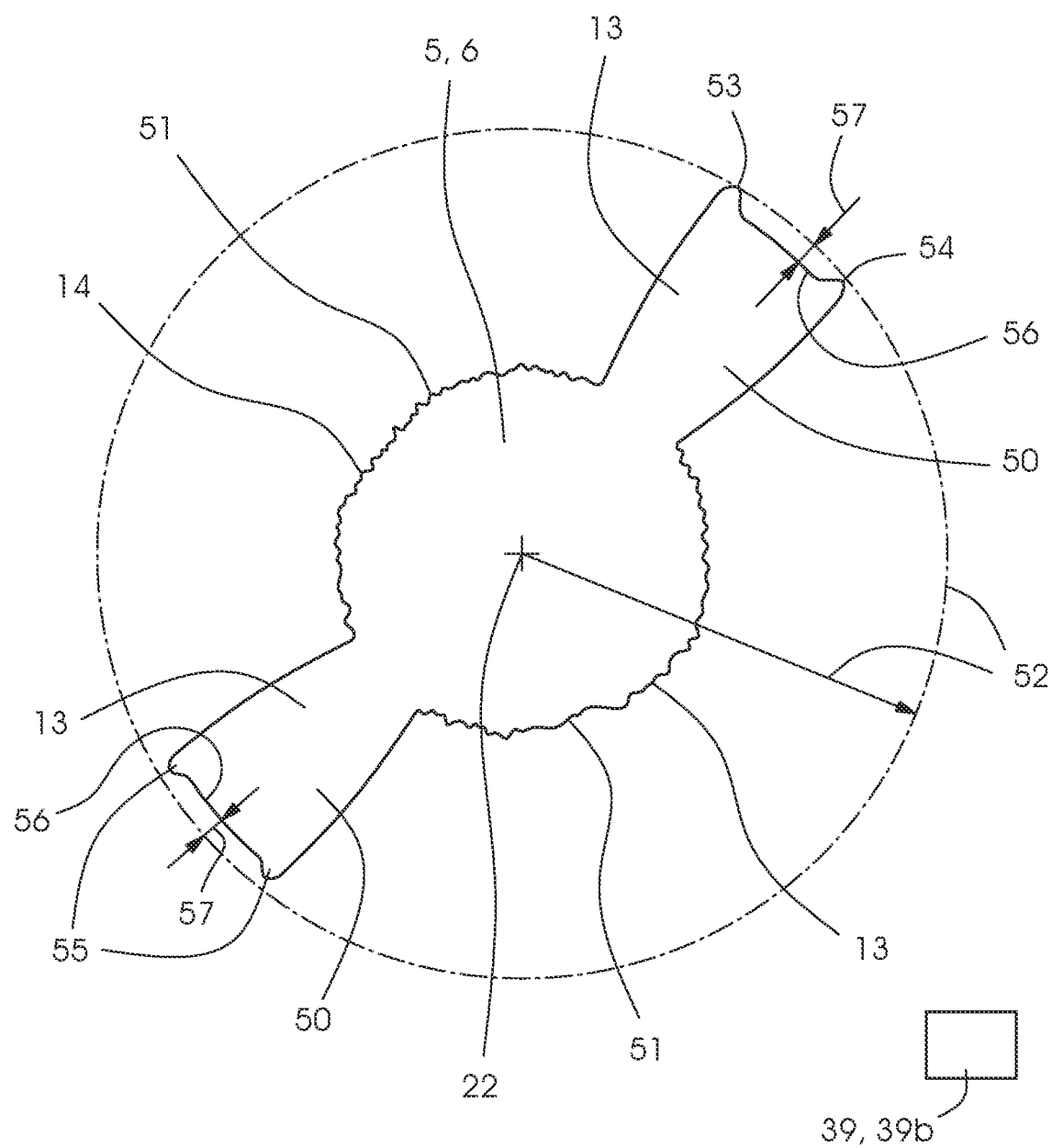

FIG. 5 is a greatly enlarged representation of an example of a topography measurement result of a printing plate 5 with two printing areas 50 and two non-printing areas 51. The radial measurement results for 360° at an axial location (relative to the axis of the carrier cylinder) are shown. The non-printing areas may for instance have been created by etching and thus have a smaller radius than the printing areas.

In the drawing, an enveloping radius 52/an envelope 52 of the dots with the greatest radius on the printing plate 5, i.e. of the highest elevations of the topography 13 at the axial location is shown.

A dot 53 on the printing plate 5 is a printing dot because during a printing operation at a normal pressure/print engagement between the printing plate 5 and the printing substrate 11/transport cylinder 17 this dot would have sufficient contact with the printing substrate and the ink-transferring anilox roller. A normal pressure setting creates a so-called kissprint, which means that the printing plate just barely touches the printing substrate and that the flexographic printing dots are not compressed to any greater extent.

A dot 53 54 is a dot which would only just print at a normal pressure setting during a printing operation because it would only just be in contact with the printing substrate.

Two dots 55 are dots which would not print because at regular pressure during a printing operation they would not be in contact with the printing substrate nor with the anilox roller.

A computer program which computationally identifies the radially lowest point 56 in the printing area 50 and its radial distance 57 to the envelope 52, for instance by using digital image processing, runs on the computer 39. This computation is made at regular intervals along the axial direction, for instance from DS to OS at all measuring points to find the respective maximum of the lowest points (i.e. the absolutely lowest value) from the DS to the center and from the center to the OS. The two maximums or the adjustment values computationally obtained therefrom may for instance be selected as the respective printing pressure adjustment values/setting for DS and OS during the printing operation, i.e. the cylinder distance between the cylinders involved in the printing operation is reduced by the setting on DS and OS. A motor-driven threaded spindle may be used on DS and OS for this purpose.

The following is a tangible numerical example:

On one side, the resultant distance is deltaR=65 µm and on the other side the resultant distance is deltaR=55 µm. For all dots 53 to 55 on the printing plate to print, 65 µm need to be set.

In all of the illustrated embodiments and the alternatives that have been given, the runout resulting from the manufacturing process and/or from the use of the sleeve 3 (due to wear) may be measured and may be factored in during the printing operation on the basis of the measurement and analysis results to improve the quality of the printed products. When a predefined runout tolerance is exceeded, an alarm may be output. The measurement may be taken on smooth and porous sleeves.

Additionally, in all of the illustrated embodiments and the alternatives that have been given, printing plate 5 thickness fluctuations which are caused by the manufacturing process, in particular in the polymeric material thereof, and/or distortions thereof, in particular resulting from the process of mounting the printing plate to the sleeve, and/or to inclusions of dust particles, hairs, or air (between the sleeve and the mounted printing plate) and/or the existing elevations due to adhesive surfaces 4 and/or temperature influences (heat expansion) may be measured. Individual dust particles may be indicated to the operator, in particular by projecting a laser spot/cross onto the printing plate 5; the operator may then remove the particle. Alternatively, a dust removal device may be moved to the position of the dust particle to remove the dust particle by using blown air or a roller.

In accordance with the invention, radar emitters 19 (in combination with suitably adapted receivers) may be used instead of the light sources 19 or light emitters 19 (which emit visible light).

In all of the illustrated embodiments and the alternatives that have been given, parameters for a dynamic pressure adjustment may be determined and passed on to the printing press. In this process, a delayed expansion of the deformable and/or compressible print dots 53 to 55 made of a polymeric material may be known (for instance pre-measured) and made available to the computer 39 to be factored in. Or a hardness of the printing plate which has been pre-measured using a durometer may be used. The expansion may in particular be a function of the printing speed during operation, i.e. this dependency on the printing speed may be factored in. For instance at higher printing speeds, a higher printing pressure setting may be chosen.

What may likewise be factored in (as an alternative or in addition to the printing speed) is the printing surface of the printing plate 5 or the dot density, i.e. the density of the printing dots on the printing plate 5, which may vary from location to location. For instance, at higher dot densities, a higher printing pressure setting may be chosen and/or the dot density may be used to set up dynamic printing pressure adjustment.

The received light 25, i.e. substantially the emitted light 23 minus the light 24 shaded off by the topography 13, may be used to determine the local dot density. It carries information about the topography 13 to be measured and/or about the surface dot density and/or on the elevations thereof.

A device 43 for determining/measuring dot density, i.e. the local values thereof, on the printing forme, for instance a flexographic printing forme, may be provided, preferably in the form of a CIS scan bar or a line scan camera. For instance, on the basis of the data that has been obtained/calculated in the dot density determination process, specification values for different printing pressure settings on DS (drive side of the printing press) and OS (operator side of the printing press) may be provided.

If the dot density of the printing plate 5 and/or of an anilox roller 15 for ink application and/or of an anilox sleeve 15 is known, the expected ink consumption of the printing operation using the printing plate on a given printing substrate 11 may be determined by computation. The ink consumption may then be used to compute the required drying power of the dryers 10 to dry the ink on the printing substrate. The expected ink consumption hat has been calculated may also be used to calculate the amount of ink that needs to be provided.

In all of the illustrated embodiments and the alternatives that have been given, a so-called cylinder bounce pattern may also be factored in. A cylinder bounce pattern is a disturbance that periodically occurs as the printing plate 5 rotates. It is caused by a page-wide or at least detrimentally wide gap or channel usually extending in an axial direction in the printed image, i.e. a detrimentally large area without printing dots, or any other type of axial gap. Such gaps or the cylinder bounce pattern they cause may affect the quality of the prints because due to the kissprint setting, the cylinders involved in the printing operation rhythmically get closer and separate again as the channel region returns during rotation. In an unfavorable case, this may result in undesired density fluctuation or in even print disruptions. An existing cylinder bounce pattern may preferably be detected by using a CIS measuring device 43 (e.g. the aforementioned pivoting or movable mirror together with the line scan cameras) or by using a line scan camera. Then it may be computationally analyzed and compensated for when the operationally required printing pressure is adjusted. On the basis of the detected cylinder bounce pattern, for instance, the speeds or rotary frequencies at which vibration would occur in a printing press may be calculated in advance. These speeds or rotary frequencies will then be avoided during production and passed over in the process of starting up the machine.

Every printing plate 5 may have its own cylinder bounce pattern. Gaps in the printing forme may have a negative influence on the print results or may even cause print disruptions. In order to reduce or even eliminate the bouncing of cylinders, the printing plate is checked for gaps in the roll-off direction. If there are known resonance frequencies of the printing unit 9, production speeds that are particularly unfavorable for a given printing forme may be calculated. These printing speeds need to be avoided as "no go speeds."

In all of the illustrated embodiments and the alternatives that have been given, register marks (or multiple register marks such as wedges, double wedges, dots, or cross hairs) on the printing forme may be detected, for instance by using the camera 21 or 43 and a downstream digital image processor, and their positions may be measured, saved, and made available. Thus register controllers or the register sensors thereof may automatically be adapted to register marks or axial positions. Thus errors which may otherwise be caused by manual adjustments of the sensors may advantageously be avoided. Alternatively, patterns may be detected and used to configure a register controller. It is also possible to automatically position a register sensor which is movable by a motor, in particular in an axial direction. It is also possible to compare a predefined zero point of the angular position of a printing cylinder and/or of a printing sleeve disposed thereon to an angular value of the actual location of a printed image (which has for example been glued on by hand), in particular in the circumferential direction (i.e. of the cylinder/sleeve). This comparison may be used to obtain an optimum starting value for the angular position of the cylinder/sleeve. In this way, register deviations may be reduced at the start of the production run. The same is true for the lateral direction (of the cylinder/sleeve).

In all of the illustrated embodiments and the alternatives that have been given, the power of the dryer 10 of the printing press 8 may likewise be controlled (potentially in a closed control loop). For instance, LED dryer segments may be switched off in areas in which no printing ink has been applied to the printing substrate, thus advantageously saving energy and prolonging the useful life of the LED.

In accordance with another advantageous feature, the power of the dryer 10 or of individual segments of the dryer may be reduced for areas on the printing plate which have a low dot density. This may save energy and/or prolong the useful life of a dryer or of individual segments. The stopping or reduction may occur in specific areas on the one hand and in a direction parallel to and/or transverse to the axial direction of a printing plate and to the lateral direction of the printing substrate to be processed by it. For instance, segments or modules of a dryer may be switched off in areas which correspond to gaps between printing plates (for instance printing plates which are spaced apart from one another, especially ones that have been glued on by hand).

In all of the illustrated embodiments and the alternatives that have been given, the respective location (on the printing plate 5) of measuring fields for print inspection systems may be detected and made available for further uses such as a location adjustment of the print inspection systems.

An inline color measuring system may be positioned in all of the illustrated embodiments and the alternatives that have been given. In order to determine the location and thus the position of the inline color measurement, an image and/or pattern recognition process is implemented to find the axial position for the measuring system. In order to provide a free space for calibration to the printing substrate, the inline color measurement system may be informed of unprinted areas.

The following section is an example of an entire process which may be carried out by a suitable embodiment of the device of the invention.

Measuring Process:

Step 1: Sleeve 3 with or without a printing plate 5 is slid onto the carrier cylinder 1 of the measuring station 2 on the air cushion and is then locked on the carrier cylinder 1.

Step 2: The sleeve is identified by a unique chain of signs 38, which may be a bar code, a 2D code (such as a QR code or a data matrix code), an RFID tag, or an NFC tag.

Step 3: Camera 21 and optionally the reference object 30 are positioned in accordance with the diameter (of the sleeve with or without the printing plate).

Step 4: The topography 13 of the printing plate, i.e. the radii of the elevations/print dots 53 to 55, is determined with the axis 6 or rather the axial center of the carrier cylinder 22 as the point of reference. In this process, the light source 19 and the camera 21 of the measuring device 18 may move in an axial direction and the carrier cylinder rotates (its angular position is known through an encoder).

Step 5: An area scan is made to detect dot densities, non-printing areas, printing areas, register marks, and/or measuring fields for inline color measurements.

Step 6: A topography algorithm running on a computer 39 is applied and the areas are analyzed through the area scan, including the detection of cylinder bounce patterns and the structure of register mark fields/inline color measurements.

Step 7: Optionally, the hardness of the plate is determined (in shore as the unit of measurement).

Step 8: A dust/hair detector is used.

Step 9: The data of the measured results are saved in a digital memory 40.

Step 10: The measured results are displayed, pointing out dust/hairs/air inclusions, and/or indicating thresholds for runout, eccentricity and/or convexity, for instance.

Step 11: The measurement may be retaken or the printing sleeve is removed to measure another sleeve.

Set-up Process:

Step 1: Sleeve 3 with printing plate 5 is slid onto the printing cylinder 16 of the printing press 8 on the air cushion that has been created by applying air to the printing cylinder 16 and is then locked thereon.

Step 2: The sleeve and its unique chain of signs 38 is identified by the respecting printing unit 9, i.e. by a sensor provided therein. This may be done by bar code, 2D code (such as a QR code or data matrix), RFID tag, or NFC tag.

Step 3: The printing unit/printing press accesses the saved data associated with the identified printing sleeve/printing plate.

Adjustment Process:

Step 1: The so-called kissprint setting (adjustment of the engagement/operating pressure) is set for the printing cylinder 16 and the screen cylinder 15, for instance based on the topography, runout, and printing substrate data, to achieve the optimum print setting. The diameter/radius are determined. The diameter/radius are known from the measurement.

Step 2: The pre-register is calculated on the basis of the register mark data on the printing plate or of a point of reference on the sleeve.

Step 3: The dynamic printing pressure adjustment is set on the basis of the determined dot density values, the printed area, the printing speed, and optionally of the printing substrate. Optionally, the hardness of the plate is factored in (in Shore as the unit of measurement).

Step 3: The optimum speed for the web of material is set, for instance on the basis of the calculation of the determined resonance frequencies of the printing unit for the printing plate by detecting the cylinder bounce pattern.

Step 5: The optimum drying power (UV or hot air) is set on the basis of the dot density values and the printed area as well as on the basis of anilox cylinder data (such as pick-up volume), and is optionally dynamically adapted to the speed of the web of material.

Step 6: The ink consumption is calculated on the basis of the dot density values and the printed area as well as on the basis of anilox cylinder data (such as pick-up volume).

Step 7: LED-UV dryer sections in places where the plate has a low dot density or where no drying is needed are reduced or switched off to save energy and increase the useful life of the LEDs.

Step 8: The register controller is set in a fully automated way on the basis of the obtained register mark data, for instance the mark configuration and the automated positioning of the register sensor.

Step 9: The measuring position for spectral inline measurement and print inspection of the printed inks is set, information on the location/the measuring position is provided.

Alternatively, patterns may be detected and used to configure a register controller.

For an automated configuration/adjustment of the control unit of the register controller, a camera (400, 21, 43) is used to subject an image of a flexographic printing forme (410) to digital image processing, for instance by using a computer (410), localizing at least one register mark (310, 311) in terms of its x and y positions.

These localized x/y data of the register mark may be saved in a digital memory 317 in association with an ID/an identifier 316 of the sleeve and may be made available to the flexographic printing press/to the flexographic printing unit when the sleeve is used and the ID is called up.

On the basis of the register mark position data (x-y localization), the flexographic printing press/the flexographic printing unit carries out the setting of the control unit of the register controller. The setting of the register control is understood to include the configuration of the register marks of a print job, for instance.

A print job usually involves operating multiple printing units which apply inks or varnishes and each of which is equipped with one flexographic printing forme (410).

The position data (x-y localization) of the print marks (310, 311) for two flexographic printing formes, for example, may be different.

For this purpose, the register control unit of the printing machine receives the position data (x-y localization) of the print mark (310, 311) for every utilized flexographic printing forme (410) with the identifier (316), which means that the configuration of the register marks of the print job may be composed of multiple flexographic printing formes (410).

An advantageous method of configuring the register controller includes the steps of recording an image (410) of the surface of the sleeve with the at least one flexographic printing forme by using a camera (400) and subjecting the image to image processing to localize at least one register mark (310) in terms of its x/y position; and, based thereon, automating the adjustment of the register controller for recording register marks.

For instance, the following steps may be envisaged:
to configure a register controller of the flexographic printing press, at least one image of the surface of the sleeve or of the surface of multiple sleeves with the at least one or more flexographic printing formes is recorded by a camera before the printing operation and the image is subjected to digital image processing, at least one or at least two register marks is/are localized in terms of their xy positions, and the configuration of the register controller is automated for the detection of register marks using the xy positional data of the register marks; or
the obtained data may be used to computationally determine which register mark of the register mark configuration is printed in which printing unit to configure the register controller of the flexographic printing press and using this information.

The following is a summary list of reference numerals and the corresponding structure used in the above description of the invention:

1 carrier cylinder
  2 measuring station
  3 sleeve/bushing
  4 adhesive tape
  5 printing plate
  6 rotary body, in particular printing plate
  7 first motor
  8 printing machine, in particular flexographic printing machine
  9 printing unit
 10 dryer
 11 printing substrate
 12 measuring rings
 13 elevations/topography
 14 surface
 15 anilox roller/anilox cylinder
 15' drive
 16 printing cylinder
 16 16' drive
 17 impression cylinder/printing substrate transport cylinder
 18 measuring device
 19 radiation sources, in particular light sources
 20 reflector 21 radiation receiver, in particular optical receiver, line scan camera
22 axis of rotation
23 light curtain/emitted light
24 shading
25 reflected light
26 working width
27 axial direction
28 direction of movement
29 second motor
29b further second motor
30 reference object/line-like object, in particular thread/string/blade/bar
31 line of reference
32 spacer / distance
33 circumferential surface
34 unit
35 circumferential direction
36 shading
37 sensor
38 identification feature
39 digital computer
39' further motor
40 accumulator
41 drive side (DS)
42 operator side (OS)
43 device for determining dot density
44 laser micrometer
45 third motor
46 measuring row
47 measuring strip
48 multiple measuring rows
50 printing area
51 non-printing area
52 enveloping radius/envelope
53 print dot on the printing plate
54 dot just barely printing on the printing plate
55 non-printing dot on the printing plate
56 lowest point
57 radial distance
29b further second motor
39b further digital computer
R radial distance
D diameter

The invention claimed is:

1. A device for measuring elevations on a surface of a rotary body provided as a cylinder, a roller, a sleeve, or a plate for a graphic industry machine, the device comprising:
   a first motor for rotating the rotary body about an axis of rotation; and
   a measuring device for taking contactless measurements, said measuring device including at least one radiation source, at least one line scan camera, a computer and a reference object being a tautened string or a tautened wire or a tautened carbon fiber;
   said computer combining individual images of said line scan camera to form a joint image.

2. The device according to claim 1, wherein said at least one line scan camera is aligned parallel to the axis of rotation of the rotary body.

3. The device according to claim 1, wherein said at least one line scan camera includes multiple line scan cameras or is formed of multiple line scan cameras.

4. The device according to claim 1, wherein said at least one line scan camera includes two line scan cameras forming a line scan camera pair, and said line scan camera pair generates at least one of a stereo image or a three-dimensional image of the surface with the elevations on the surface.

5. The device according to claim 1, wherein said measuring device includes at least one reflector.

6. The device according to claim 1, wherein said reference object is line-shaped and tautened in a direction parallel to the axis of rotation or an object with a cutting edge or a bar.

7. A device for measuring elevations on a surface of a rotary body provided as a cylinder, a roller, a sleeve, or a plate for a graphic industry machine, the device comprising:
   a first motor for rotating the rotary body about an axis of rotation;
   a measuring device for taking contactless measurements, said measuring device including at least one radiation source, at least one line scan camera, and a computer;
   said computer combining individual images of said at least one line scan camera to form a joint image;
   said at least one line scan camera being shorter than an axial extension of the rotary body; and
   another motor moving said at least one line scan camera in an axial direction for a recording operation.

8. A device for measuring elevations on a surface of a rotary body provided as a cylinder, a roller, a sleeve, or a plate for a graphic industry machine, the device comprising:
   a first motor for rotating the rotary body about an axis of rotation;
   a measuring device for taking contactless measurements, said measuring device including at least one radiation source, at least one line scan camera, and a computer;
   said computer combining individual images of said at least one line scan camera to form a joint image;
   said at least one line scan camera being aligned parallel to the axis of rotation of the rotary body; and
   a second motor for adjusting said measuring device in a direction perpendicular to the axis of rotation.

9. The device according to claim 8, wherein said second motor adjusts said reference object in the direction perpendicular to the axis of rotation.

10. The device according to claim 9, which further comprises a further second motor for adjusting said reference object in a direction perpendicular to the axis of rotation.

11. The device according to claim 9, which further comprises a third motor for moving said at least one radiation source and said at least one line scan camera in a direction parallel to the axis of rotation.

12. A system, comprising:
    a measuring device according to claim 1;
    a flexographic printing press including a further computer, and at least one printing unit having an impression cylinder, at least one flexographic printing cylinder, and at least one anilox roller; and
    at least one drive for adjusting contact pressure at least one of between said impression cylinder and said flexographic printing cylinder or between said flexographic printing cylinder and said anilox roller; and
    said computer receiving and using the data when the contact pressure is adjusted by activating said at least one drive.

* * * * *